United States Patent [19]

Okamoto et al.

[11] Patent Number: 4,622,600
[45] Date of Patent: Nov. 11, 1986

[54] ROTARY-HEAD TYPE PCM DATA RECORDING/REPRODUCING METHOD AND APPARATUS WITH A REDUNDANCY-REDUCED CONTROL DATA FORMAT

[75] Inventors: Hiroo Okamoto; Masaharu Kobayashi; Takaharu Noguchi; Takao Arai, all of Yokohama, Japan

[73] Assignee: Hitachi, Ltd., Tokyo, Japan

[21] Appl. No.: 685,551

[22] Filed: Dec. 24, 1984

[30] Foreign Application Priority Data

Dec. 26, 1983 [JP] Japan ................. 58-243858
Dec. 26, 1983 [JP] Japan ................. 58-243859
Jan. 11, 1984 [JP] Japan ................. 59-1923

[51] Int. Cl.[4] ................................. G11B 5/09
[52] U.S. Cl. ........................ 360/32; 360/48; 360/49
[58] Field of Search ............... 360/32, 48, 49; 369/49

[56] References Cited

U.S. PATENT DOCUMENTS

4,143,406  3/1979  Tsuiki et al. ................. 360/48
4,389,681  6/1983  Tanaka et al. ................ 360/48
4,403,261  9/1983  Tanaka et al. ................ 360/32
4,492,989  1/1985  Watanbe et al. ............... 360/32

Primary Examiner—Vincent P. Canney
Attorney, Agent, or Firm—Antonelli, Terry & Wands

[57] ABSTRACT

A rotary-head PCM data recorder in which PCM signals of m in number, a synchronizing signal, control signals related to the PCM signals, and a parity signal for error detection and correction are formed into data blocks, and data blocks of n in number are recorded on one track of a magnetic tape. Among the control signals, bits of signals common to n data blocks (i.e., information needed once for each track) are formed in distributed data allocated in a group of consecutive blocks or tracks, and multiple block distributive control data are recorded on one track multiple number of times, or multiple track distributive control data are recorded along n block strings a multiple number of times. In reproduction, block or track distributive data are composed to reproduce the control signals. The recorder thus arranged reduces the bit number needed for the control signals and compensates dropout of reproduced data due to scratches on the tape and the like.

9 Claims, 11 Drawing Figures

FIG. 1
PRIOR ART
PCM RECORD FORMAT

FIG. 2
CONTROL SIG. FORMAT

FIG. 3
CONTROL SIGNAL FORMAT

FIG. 9
CONTROL DATA FORMAT

EVEN BLOCK
ID      A

ODD BLOCK
ID      B

FIG. 10
ROTARY HEAD PCM RECORDER

FIG. 11
PCM AUDIO PLAYER

ROTARY-HEAD TYPE PCM DATA RECORDING/REPRODUCING METHOD AND APPARATUS WITH A REDUNDANCY-REDUCED CONTROL DATA FORMAT

BACKGROUND OF THE INVENTION

The present invention relates to a data recording technique for a PCM data recorder utilizing a rotary head mechanism and, particularly, to a method and apparatus for recording PCM data suitable for arranging appended information associated with the PCM data in a recording medium without increasing the redundancy of the PCM data.

A PCM audio recording and reproducing system, which converts an analog audio signal into PCM digital signals, records the digital signals on a recording medium, and thereafter reproduces the digital signals and converts them back into the analog audio signal, achieves a drastic improvement in the reproduced sound quality as compared with the conventional analog audio recording and reproducing system. However, this system needs an amount of information to be transmitted which is approximately 50 times as much as the case of the analog audio system, and when a magnetic tape is used as the recording medium, it is necessary to increase the amount of information transmitted in a unit time length by increasing the number of tracks or by increasing the tape speed as practiced in the rotary head tape recorder system. Currently known PCM recording and reproducing (recorder) systems include a stationary-head type digital audio tape (S-DAT) recorder system using multiple tracks, and a rotary-head type digital audio tape (R-DAT) recorder system. The R-DAT system has great potential for the growth of PCM audio recorders among home users from the viewpoints of cost reduction, running economy and versatility of available functions. One of the functions which is practicable for the R-DAT system, but is not feasible for the S-DAT system is a fast address search function in a high-speed mode. This function appends a specific address code to each block of PCM data recorded on the tape, so as to indicate the block position among several music programs in a normal playback mode and also to search for a specific block of a record in the fast address search mode. In the R-DAT system, PCM signals are partitioned or divided into units of a certain number of symbols or words (e.g. one symbol consists of 8 bits), e.g., into 12-symbol units to essentially form a block, so that each block forms a unit number of symbols. A certain number of blocks, e.g., 128 blocks, are recorded on one track of the tape to form one frame, i.e., one track for a unit of PCM signal processing. See, for example, an article by Odaka "A Rotary Head High Density Digital Audio Tape Recorder" in the Institute of Electronics and Communication Engineers of Japan Electroacoustic Conference Data EA82-46 (1982).

Figure 1:
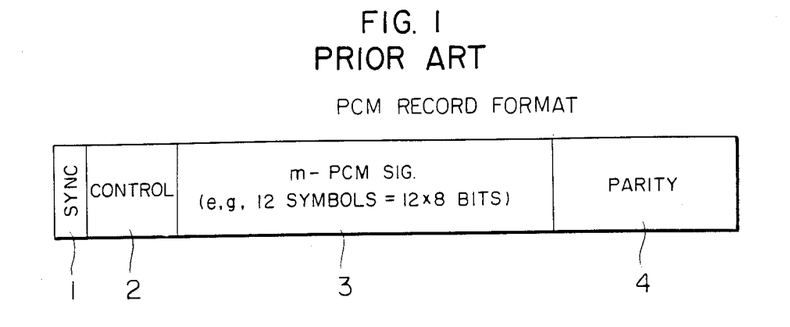
FIG. 1 is a diagram showing the record format of PCM signals processed by the rotary-head PCM data recorder.

FIG. 1 shows a record format of one block in a R-DAT system, also called a block format. The format includes a synchronizing signal 1 providing a reference timing in a playback operation, control signals 2 including information necessary to reproduce recorded PCM signals, PCM signals 3, and a parity signal 4 for error detection and correction. See, for example, a literature of Iwashita "Activity in DAD conference" in Japanese periodical "Electronics" published by EIAJ, October, 1984.

Figure 2:
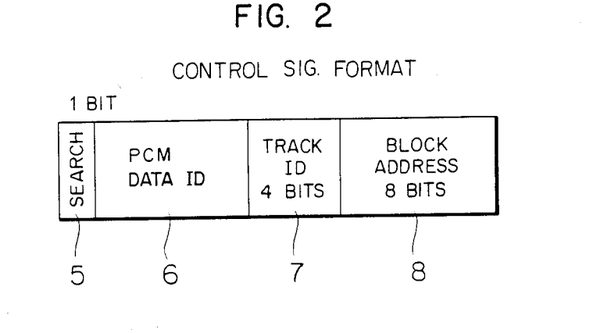
FIG. 2 is a diagram showing format of the control signals included in the PCM signal format.

FIG. 2 shows, as an example, the detailed format of the control signals 2 shown in FIG. 1. In the control signal format, a 1-bit signal 5 is provided to identify the head or beginning of music programs recorded on the tape, by taking two signal levels "0" during a program, and "1" between adjacent programs, and this signal 5 is used to search for a program. PCM signal control information 6 associated with the recorded PCM signals includes the sampling frequency, the number of quantization bits, the quantization mode (linear, non-linear, etc.), analog characteristics (emphasis, noise reduction, etc.), a dubbing inhibit code, a mute signal, and the signal type. Recording of this information in BCD code would need as many as 24 bits. Track identification signal 7 is used to detect the occurrence of track-jump during a tape playback operation, and it needs as many as 4 bits. Block address 8 is a signal for preventing the interleave-displacement during the playback operation, and it needs at least 7 bits for the case of recording 128 blocks in one track.

As described above, control signals need a total of about 36 bits, which is equal to almost 40% of each block PCM signal (12 symbols consist of 96 bits), thus increasing the bit redundancy.

SUMMARY OF THE INVENTION

It is an object of the present invention to provide a method and apparatus of recording and reproducing appended PCM signal control information in a R-DAT system, wherein the redundancy is reduced and the appended information is easily and efficiently detected.

Another object of the invention is to provide a method of recording digital signals, wherein the error detection capability for detecting abnormal signals caused by track-jump or miscorrection is improved.

Still another object of the invention is to provide a method and apparatus for recording and reproducing PCM data, which provides a record format of appended information with high error detection capability and reduced redundancy.

According to one aspect of the present invention, in a data recording method for a PCM tape recorder with a rotary head, control signals are dispersed in blocks of data recorded on one or more tracks, so that the control signals are less redundant and yet easily detected. One complete set of control signals for each track is, on a bit basis, distributed in a predetermined number of blocks included in the track, whereby the number of bits needed to record the control signals in each block can be reduced. This is because the control signals do not change within the same program and accordingly these control signal may be recorded once or a limited number of times for each track or for each group of tracks. The control signals distributed in several blocks on a bit basis can be compensated for dropout during reproduction due to scratches etc. on the tape by recording them repeatedly in several other blocks on the same track.

This method enables the recording of information related to PCM signals to be recorded with less amount of recorded data and also allows easy retrieval of the recorded information without regard to possible dropout of parts of the reproduction signal. By reducing the number of times of repetition of recording for one complete set of control signals, the variety of information can be enriched in exchange.

According to another aspect of the present invention, appended information recorded together with PCM signals on a recording medium such as a magnetic tape includes the maximum value of the PCM signals recorded on one track, so that abnormal signals are removed in the playback operation on the basis of the comparison of each reproduced PCM signal with the maximum value. Consequently, abnormal data created by miscorrection or track-jump in the playback operation is eliminated, whereby acoustic noise in the PCM audio system can be prevented from occurring.

BRIEF DESCRIPTION OF THE DRAWINGS

The present invention will now be described with reference to the accompanying drawings.

DETAILED DESCRIPTION OF THE PREFERRED EMBODIMENTS

Figure 3:
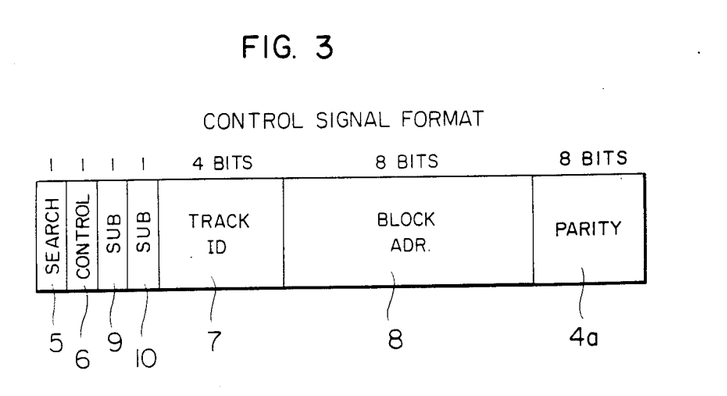
FIG. 3 is a diagram showing the format of the control signals according to an embodiment of the present invention.
Figure 4:
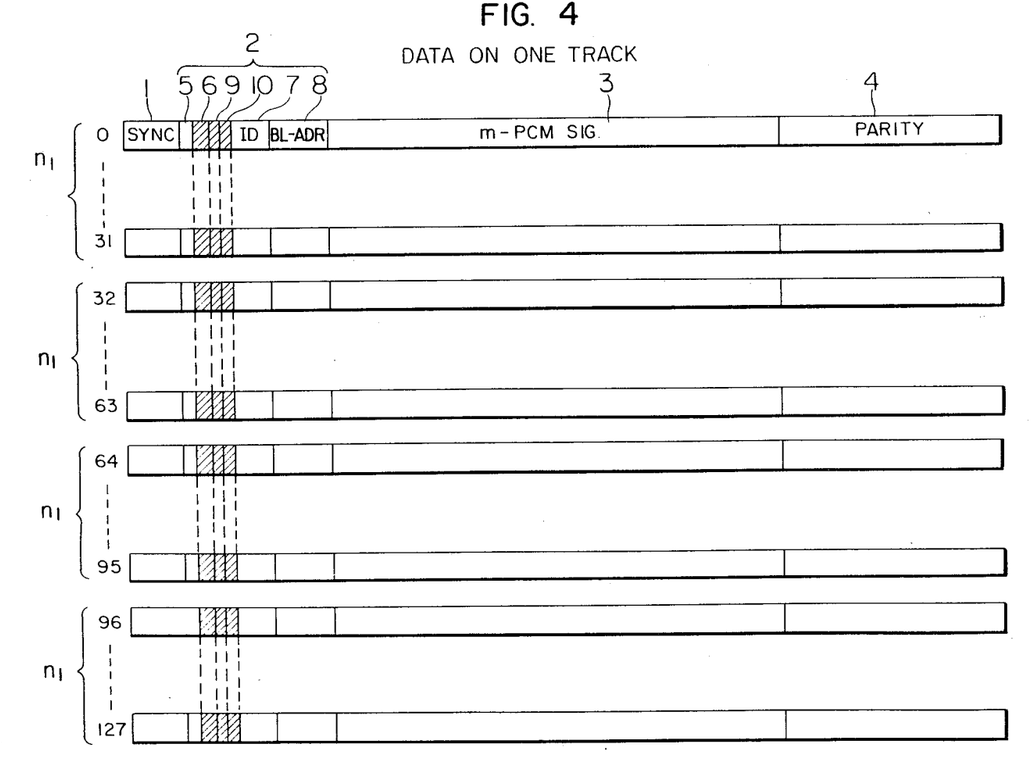
FIG. 4 is a diagram for explaining an embodiment of this invention, showing the 128 blocks which make up a track arranged side-by-side to illustrate the correspondence of the bit positions.
Figure 5:
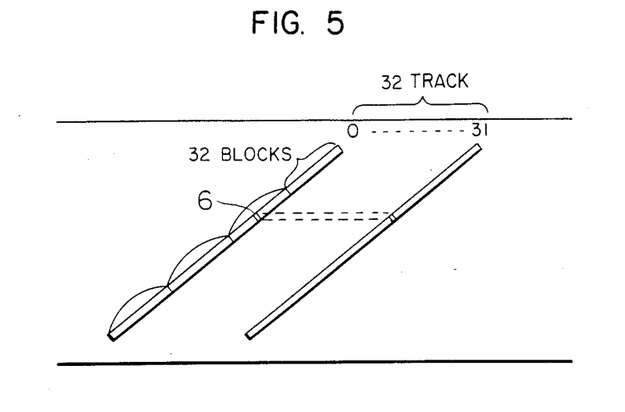
FIG. 5 is a diagram showing the layout of control signal data.
Figure 6:
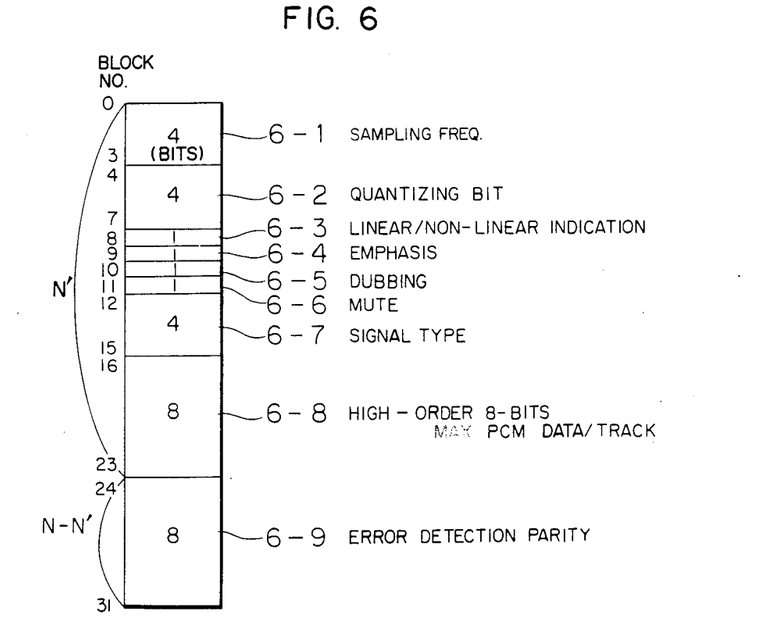
FIG. 6 is a diagram showing the format of common control information for PCM signals.

An embodiment of the present invention will be described with reference to FIGS. 3 and 4. In FIG. 3, control signals formatted in 24 bits in each block includes a 1-bit search signal 5, a 4-bit track identification signal 7, an 8-bit block address signal 8, and an 8-bit parity signal for error detection and a distributed part of PCM signal information 6. The search signal 5 is preferably appended to every block so as to facilitate a search for a program recorded on the tape at random. The track identification signal 7 and block address signal 8 naturally must be appended to every block. Sections 9 and 10 in the format form a sub-code area which may contain respective content or program time lengths, titles, search items, and the like. The sub-code area also must be added to every block. PCM signal information 6 may be provided for every track or every group of tracks, because its contents, detailed later in FIG. 6, called "ID codes", vary over a long period as compared with a unit length of one field, i.e., one track. In the case of appending the PCM signal information or PCM data identification signal 6 to every track, a respective bit of the 32 bit signal is assigned to the second bit position of control signals 2 of 32 consecutive blocks as a group, i.e., using 32 bits, as shown in FIG. 4. The respective bits of PCM control information 6 are recorded in several spaced or intermittent locations on a track. In this example, the respective bits of the same PCM control information 6 are recorded in four group locations of blocks 0–31, blocks 32–63, blocks 64–95 and blocks 96–127. Thus, in accordance with the embodiment of FIG. 4, the first bit of a control information data in FIG. 6 is recorded at a location 6 of the block 0, the second bit is recorded at location 6 of the block 1 . . . and the 32nd bit is recorded at location 6 of the block 31, successively. In a like manner, the first to 32nd bits are recorded in blocks 32–63, 64–95, and 96–127 as well. In another case, where the PCM control information 6 is recorded on a plurality of a tracks, the respective bits of information 6 are dispersed in the second bit position of control signal series in respective blocks of 32 consecutive tracks as a group, i.e., using 32 bits, as shown in FIG. 5. The same part of the PCM signal information 6 is repeatedly recorded in 128 locations of blocks 0–127 in a respective track. In the embodiment of FIG. 5, the first bit in the data of FIG. 6 is recorded at location 6 of each block of the first track, the second bit to location 6 each block of the second track, and the 32nd bit is recorded in each block of the 32nd track. Thus, the same data bit is recorded at location 6 in blocks 0–127 of each track.

In FIG. 6, a 32-bit complete PCM control information 6 includes sampling frequency 6-1, the number of quantization bits 6-2, a quantization mode (linear/nonlinear) 6-3, an emphasis specification 6-4, a dubbing inhibit code 6-5, a mute signal 6-6, and the signal type 6-7. An 8-bit portion 6-8 may provide an indication of the maximum value of the recorded PCM signals. By checking the absolute values of the PCM signals recorded on one track, the high-order 8 bits (excluding the sign bit) of a PCM signal having the maximum absolute value may be recorded in the portion 6-8. During the playback operation, each PCM signal is compared with the maximum value recorded in the portion 6-8, and if a signal in excess of the maximum value is detected, it is removed so as to prevent an acoustic noise caused by the abnormal detected signal. This test may be carried out for PCM signals of 2-channel stereo audio signals individually. The last 8-bit portion 6-9 is a parity signal of error detection for the bits of one complete set of control information 6 shown in FIG. 6.

Information of portions 6-1 through 6-8 may be arranged in a different manner than stated above. By assembling information of PCM signals of several blocks, the number of bits needed for each block of the PCM control information 6 can be reduced. Furthermore, by provision of error detection parity data 6-9, system malfunction caused by erroneous data during reproduction can be prevented.

As mentioned above, the same PCM control information 6 is recorded in four locations on one track in the case of the format shown in FIG. 4, and in 128 locations of one track in the case of the format shown in FIG. 5, whereby the PCM control information 6 can be reproduced correctly even if part of the reproduced signal drops out due to scratches on the tape and the like.

The third and fourth bits referred to by sub-code sections 9 and 10 in FIG. 3 contain other desired information whose bits may be shared among several blocks so that much information can be recorded as a group of sub-code sections.

With respect to the record format of FIG. 5, the track identification signal 7 is used to determine which track includes a specific bit position of PCM control information shown in FIG. 6. The 4-bit track identification signal 7 can discriminate 16 different tracks. In actual practice, one of two adjacent tracks can be distinguished based on the azimuth angle of the recording head, and therefore, 32 tracks can be discriminated by the 4-bit track identification signal 7.

Figure 7:
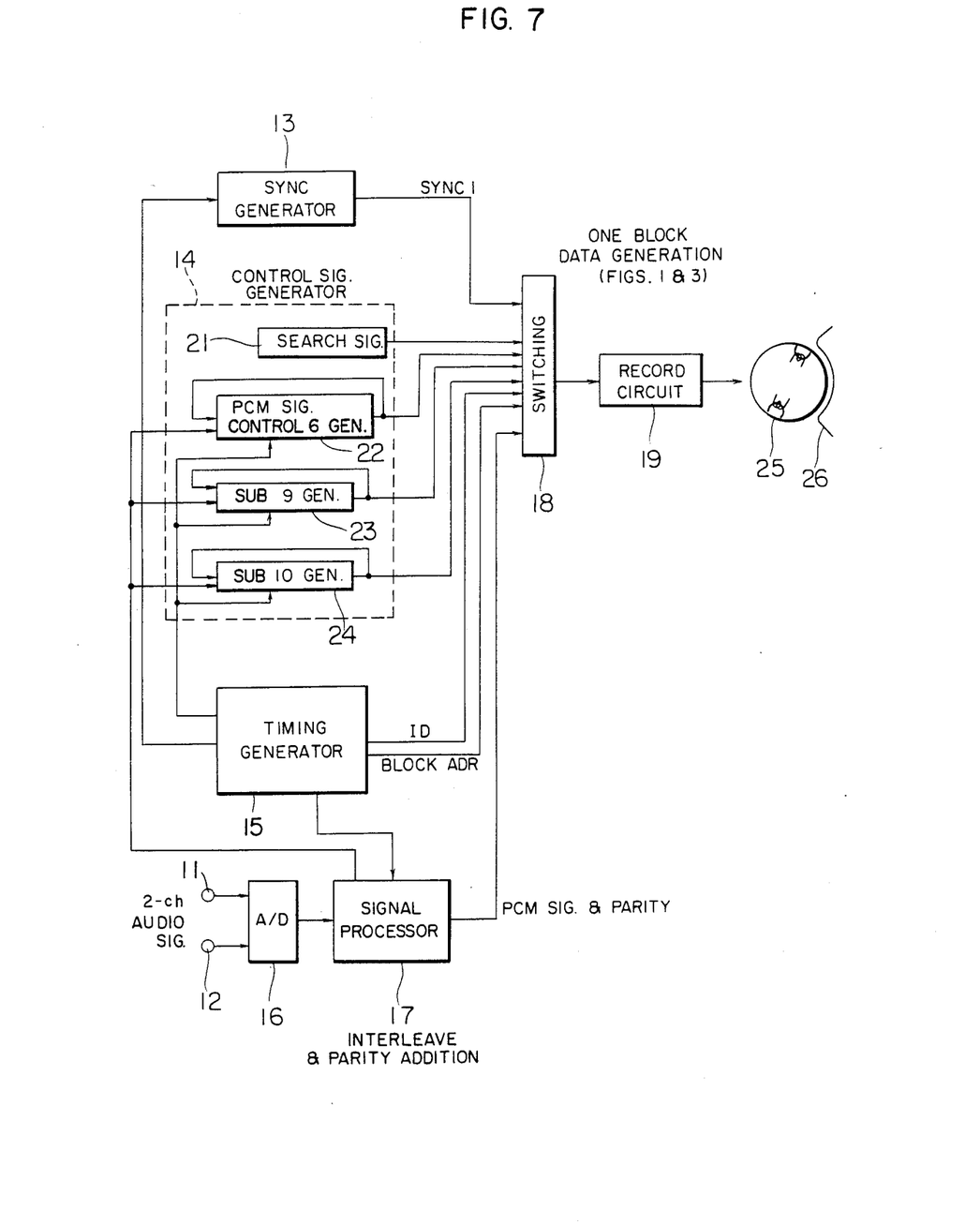
FIG. 7 is a block diagram showing an arrangement of a rotary head PCM data recorder according to an embodiment of the present invention.

FIG. 7 shows a general circuit arrangement of the rotary-head PCM data recorder by which the control signals according to an embodiment of this invention are recorded. The circuit arrangement includes a synchronizing signal generator 13, a control signal generator 14, a timing generator 15, an A/D converter 16, a signal processor 17, a signal switching circuit 18 and a recording circuit 19.

In operation, 2-channel audio signals entered through input terminals 11 and 12 are converted into PCM digital signals by the A/D converter 16, and the PCM digital signals are subjected to an interleaving operation and parity signals are added by the signal processor 17.

The PCM control signals are produced by the control signal generator 14, in which a search signal generating circuit 21 produces the search signal 5. A PCM control information generating circuit 22 is formed of a 32-bit shift register with its output linked to the input so that data is circulated by a shift operation. The shift register 22 is loaded in advance with the 32-bit data shown in FIG. 6 from the signal processor 17. In recording the control signals, the shift register 22 is clocked so that the PCM control information 6 to be recorded in each block (FIG. 4) or on each track (FIG. 5) is generated. Circuits 23 and 24 generate information to be recorded in sub-code or optional-code sections 9 and 10 in FIG. 3, and operate similarly to the PCM control information generating circuit 22.

In the recording operation, the signal switching circuit 18, which is formed of a multiplexer, selects the synchronizing signal 1 produced by the synchronizing signal generator 13, the signal produced by the control signal generator 14, the track identification signal and block address signal produced by the timing generator 15, the PCM audio signal and the parity signal provided by the signal processor 17 sequentially so as to arrange a block of data as shown in FIGS. 1 and 3. The block signal is processed into a recording signal form by the recording circuit 19 and recorded on a magnetic tape 26 by magnetic heads 25 mounted on a rotary cylinder.

Figure 8:
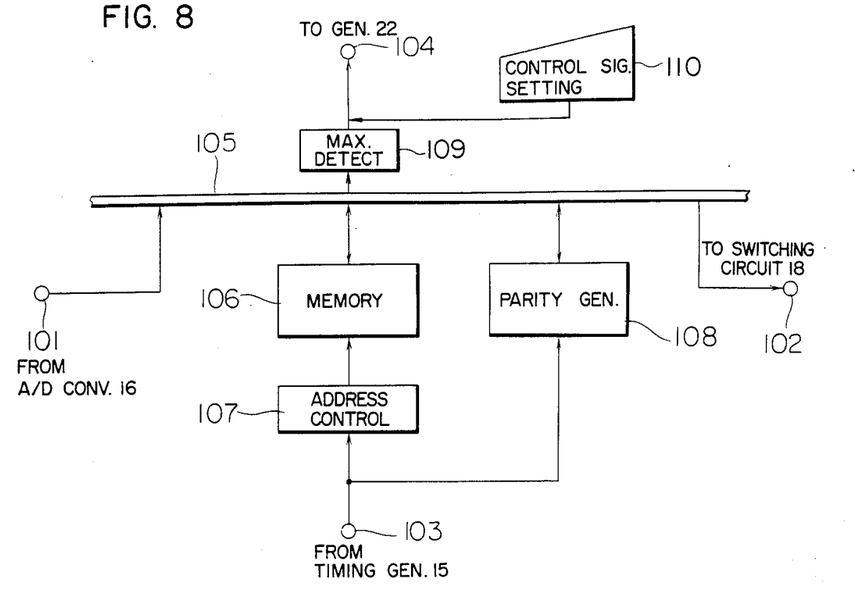
FIG. 8 is a block diagram showing in detail a part of the arrangement shown in FIG. 7.

FIG. 8 shows the arrangement of the signal processor 176, which includes a bus line 105, a memory (RAM) 106, a memory address control circuit 107, a parity signal generating circuit 108, and a maximum value detecting circuit 109. Input terminal 101 receives the PCM signal from the A/D converter 16, and this signal is fed through the bus line 105 and stored in the memory 106. The input PCM signal is also fed to the maximum value detecting circuit 109 so that the maximum value among PCM signals to be recorded on one track is detected. The maximum value detected by the circuit 109 is sent out through the output terminal 104 and loaded to the PCM control information generator 22.

The PCM signals stored in the memory 106 are read out to the parity signal generating circuit 108, in which a parity signal is generated and stored in the parity signal area of the memory 106. In the recording operation, the PCM signals and parity signal are read out of the memory 106 and fed through the output terminal 102 to the signal switching circuit 18 (FIG. 7). Another terminal 103 receives control signals produced by the timing generator 15 to control the timing of the entire circuit 17. The signal processor 17 further comprises a control data setting circuit 110 such as a keyboard, which generates and sets various types of control information 6 into the shift register 22.

Figure 9:
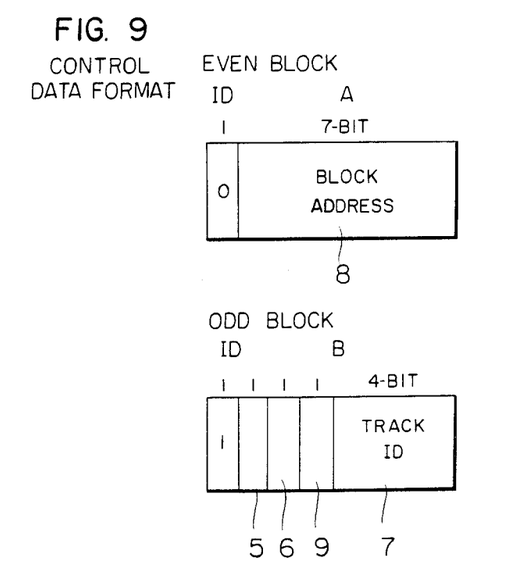
FIG. 9 consisting of A and B is a diagram showing the format of the control signals according to another embodiment of the present invention.

FIG. 9 shows the format of control signals according to another embodiment of the present invention. The control signals are divided into two 8-bit portions, one being control signals shown by A assigned to even-numbered blocks in one track and the other being control signals shown by B assigned to odd-numbered blocks in the track. The first bit of each format indicates either even or odd numbered block; "0" for an even-numbered block and "1" for an odd-numbered block. The format A contains the block address in the remaining 7 bit positions (the lowest bit of block address is indicated by the first bit of the format). The format B for odd-numbered blocks contains the search signal 5 in the second bit position, the PCM control information 6 in the third bit position, other auxiliary information 9 in the fourth bit position, and the track identification signal 7 in the fifth-eighth bit positions. The PCM signal information 6 and other auxiliary information in sub-code section 9 are arranged to be shared by 32 blocks as in the case of FIG. 4 or FIG. 5. Because of 64 odd-numbered blocks containing the information signals in sections 6 and 9 on one track, they are recorded twice in each track. The number of repetition of these information signals 6 and 9 recorded on one track can be determined arbitrarily depending on the number of blocks and the amount of information. For example, in the case of a track made up of 240 blocks, the PCM control information can be formed by 40 bits and recorded three times on each track.

Figure 10:
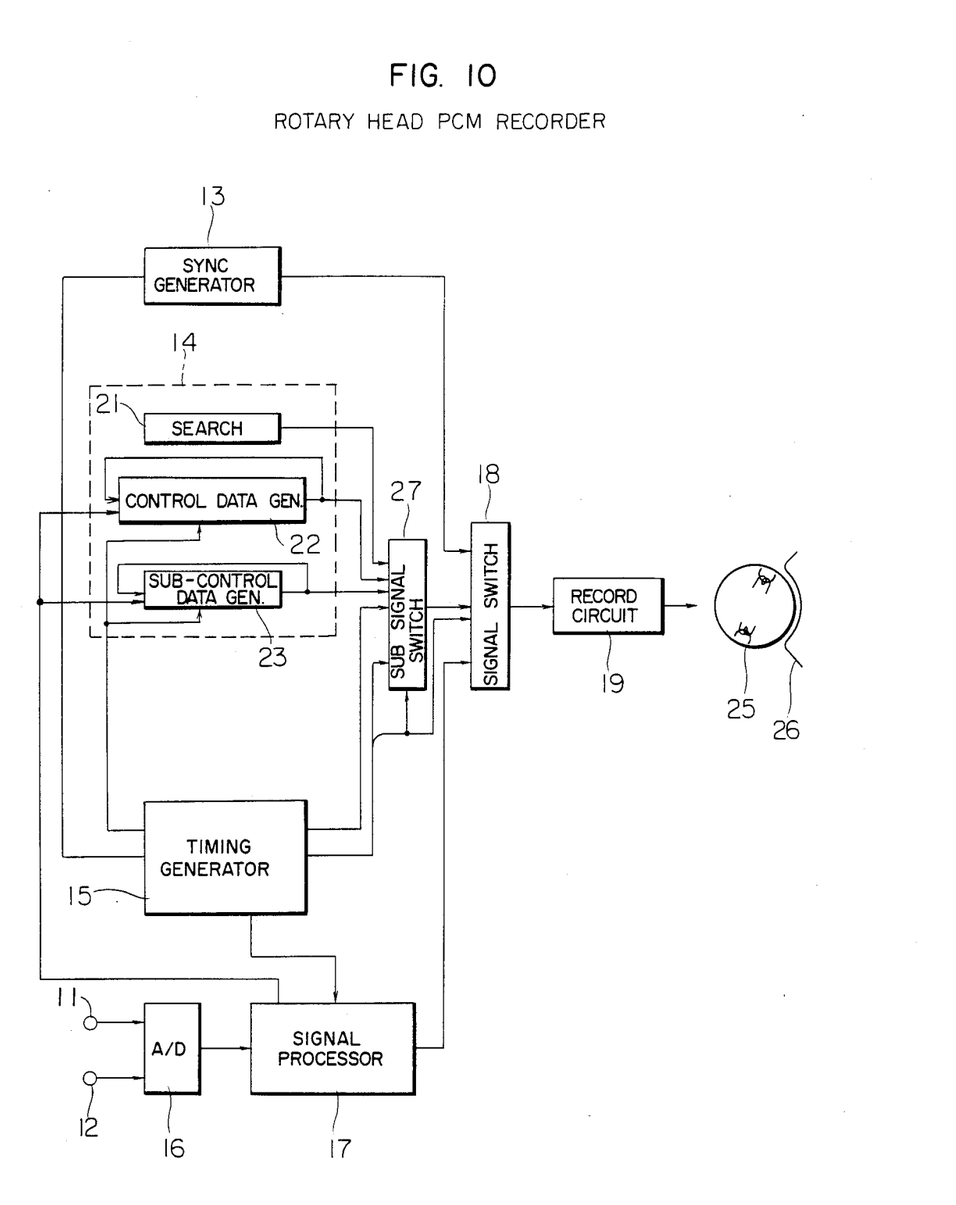
FIG. 10 is a block diagram showing another embodiment of the rotary-head PCM data recorder.

FIG. 10 shows the general circuit arrangement of a rotary-head PCM data recorder adapted to record various signals in the format shown in FIG. 9. In FIG. 10, the identical components to those shown in FIG. 7 are referred to by like references.

The signal switching circuit 18 receives input control signals in accordance with the lowest bit of the block address provided by the timing generator 15. A subsidiary signal switching circuit 27 is provided to select all bits of signal 8 except for the lowest bit when the lowest bit of the block address is "0", and to select the outputs of the control signal generator 14 and the track identification signal 7 provided by the timing generator 15 when the lowest bit of the block address is "1". Thus, the control signals 6 are assembled by combining outputs from the subsidiary signal switching circuit 27 and the lowest bit of the block address.

For the arrangement of control information shown in FIG. 5, which is not needed for each track, using a complete set of control signals distributed in several tracks, the number of bits of control signals can be reduced. By recording the same portion of information in several different locations of a track, the dropout of reproduced data due to scratches or dust on the tape can be compensated safely.

Figure 11:
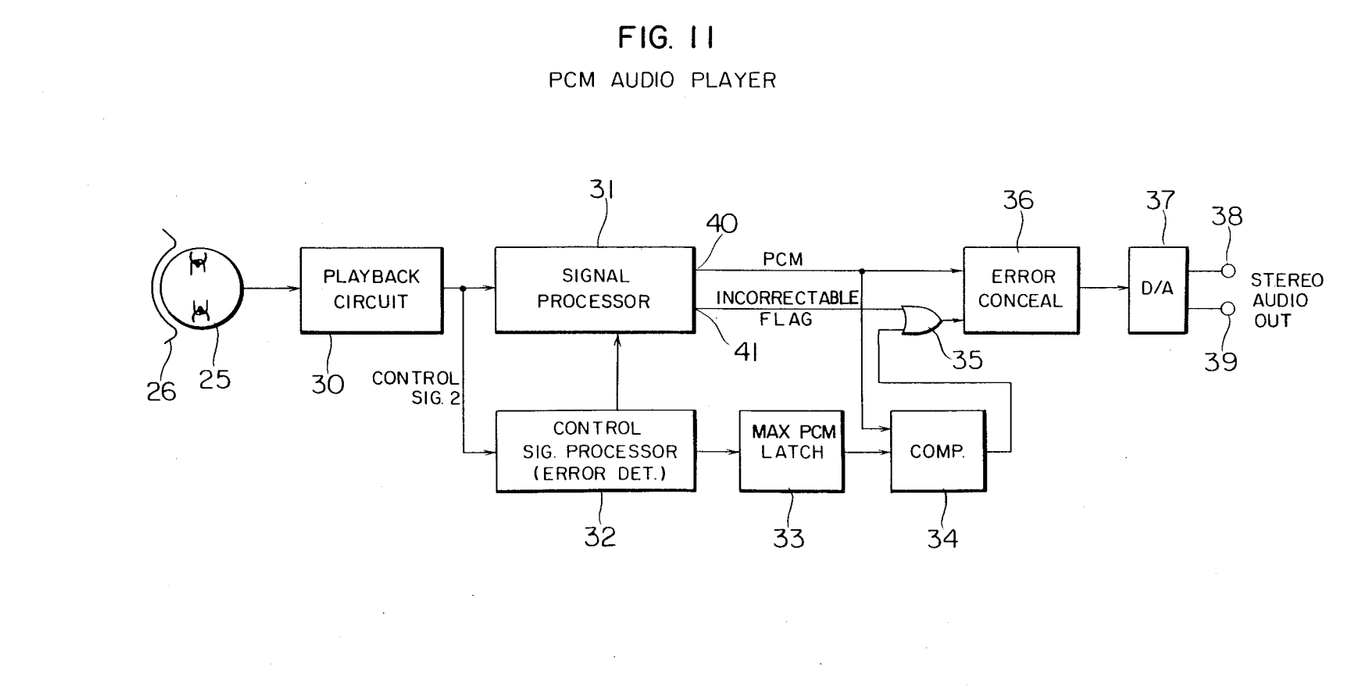
FIG. 11 is a block diagram showing an example of a playback circuit used with the PCM data recording system of the present invention.

FIG. 11 shows an arrangement of a PCM data reproduction system for reproducing digital signals recorded on a recording medium by the recording system of the present invention. The arrangement includes a signal reproducing circuit 30, a signal processing circuit 31, a control signal processing circuit 32, a latch circuit 33, a comparator 34, an error conceal circuit 36 using a known technique, such as previous data holding or interpolation, and a D/A converter 37.

The PCM signals picked up from the magnetic tape 26 by the reproducing heads 25 are amplified and subjected to synchronizing signal detection by the signal reproducing circuit 30. PCM signals are processed for error detection and correction by the signal processing circuit 31, and processed and corrected PCM signals are fed to the following stage through the output terminal 40. If error correction has failed, an incorrectable flag is produced to another output terminal 41, and a further error correcting process such as mean value interpolation is carried out by the error conceal circuit 36.

A picked-up control signal 2 is delivered to the control signal processing circuit 32, in which error detection for the picked-up control signal is carried out using the parity signal 6-9, then completely reproduced control signals 6-1 through 6-7 are fed to the signal processing circuit 31. The maximum value 6-8 of the PCM signals is held in the latch circuit 33 until the whole data on one track is picked up. The comparator 34 compares the absolute value of each PCM signal with the value held in the latch circuit 33, and if a PCM signal in excess of the maximum value is detected, it is determined to be abnormal data and an incorrectable flag is added thereto by the OR gate 35, causing the error conceal circuit 36 to be activated for error concealment. The output of the error conceal circuit 36 is reconverted into 2-channel analog signals by the D/A converter 37 and sent out through audio output terminals 38 and 39.

What is claimed is:

1. A method of recording data on a magnetic tape using a rotary-head PCM signal recorder by forming m PCM signals to which are appended a synchronizing signal, control signals of substantially greater than k bits representing control data related to said PCM signals, and a parity signal for error detection and correction to form one block of a record, with signals of n blocks being recorded on one track of said magnetic tape, comprising the steps of:
    (a): distributing the bits of control data in the control signals which are common to at least one track of n blocks by distributing said data in the blocks of each of a number of groups of $n_1$ blocks in said track by allocating k bits of said control data to each of the blocks of each group, the number of groups $n_2$ satisfying the relationship $n = n_1 \times n_2$, and
    (b): recording said distributed control data $n_2$ times on one track, where m, n, $n_1$ and $n_2$ are positive integers more than 1, and k is a positive integer.

2. A data recording method according to claim 1, wherein said distributed data of $n_1 \times k$ bits comprises common signal information of $n_3 \times k$ bits and an error detection signal of $(n_1 - n_3) \times k$ bits used in composing said common signal information where $n_3$ is a positive integer.

3. A data recording method according to claim 1, wherein high-order bits of a predetermined number excluding a sign bit of a signal representing a maximum absolute value among PCM signals of $m \times n$ in number recorded on one track or $m \times n \times N$ in number recorded on N tracks are recorded in bits of said distributed data.

4. A method of recording data on a magnetic tape using a rotary-head PCM signal recorder by forming m PCM signals to which are appended a synchronizing signal, control signals of substantially greater than k bits representing control data related to said PCM signals, and a parity signal for error detection and correction to form one block of a record, with signals of n blocks being recorded on one track of said magnetic tape, comprising the steps of:
    (a): distributing the bits of control data in said control signals which are common to at least N tracks by allocating k bits of said control data to each track of said N tracks; and
    (b): recording said distributed data of k bits N/k times on one track, where m, n, N and k are positive integers.

5. A data recording method according to claim 4, wherein said distributed data of $N \times k$ bits comprises a common control signal of N' bits and an error detection signal of $(N-k-N')$ bits used in composing said common control signal.

6. A data recording method according to claim 4, wherein high-order bits of a predetermined number excluding a sign bit of a signal representing a maximum absolute value among PCM signals of $m \times n$ in number recorded on $m \times n \times N$ in number recorded on N tracks are included in bits of said distributed data.

7. A method of recording and reproducing an audio signal on a magnetic tape using a rotary-head PCM data recorder in which said audio signal is converted into digital signals, said digital signals are processed to form signals of n data blocks for each track and said data block signals are recorded and, thereafter, reproduced on each track, of said magnetic tape, wherein said data block includes a synchronizing signal, m PCM signals, control signals of substantially greater than k bits representing control data related to said PCM signals and a parity signal for error detection and correction, said control signals including common control signals used in common to at least n data blocks recorded on one track, said method comprising the steps of: in recording said audio signal
    (a) generating a bit string for forming said common control signals;
    (b) allocating bits of said bit string distributively in data blocks constituting each of multiple groups of data block forming altogether said n data blocks so that said bit string is distributed in data blocks of each group;
    (c) recording each block containing said distributed data bits of said magnetic tape; and
    (d) in reproducing said audio signal, composing bits distributed in groups of data blocks derived from said tape so as to reproduce said common control signals.

8. A rotary-head PCM tape recorder comprising:
    (a) analog-to-digital (A/D) converting means for converting an input analog signal to digital signals of word string;
    (b) signal processing means for interleaving said digital signals so as to form a plurality of data blocks each including a predetermined number of words, and appending a parity signal to each data block;
    (c) control signal generating means for providing control signals including information necessary for the reproduction of said digital signals and also including information related to the first-mentioned information;
    (d) timing generation means for producing a track identification signal and a block address signal;

(e) synchronizing signal generating means for producing a synchronizing signal for discriminating said data blocks;
(f) multiplexer means for selecting outputs of said synchronizing signal generating means, said control signal generating means, said timing generation means and said signal processing means sequentially so as to produce a string of PCM recording signal;
(g) means for recording the output of said multiplexer means on said magnetic tape using said rotary head; and (h) said control signal generating means comprising means for generating control signal bits for a control bit area of each data block such that bits of control signals common to a predetermined number of blocks are allocated to multiple block groups and same control signals are arranged in at least said multiple block groups.

9. A recorder according to claim 7, wherein said predetermined number of block groups constitute a track of record, said control signal generating means and said timing generation means operate in unison so that said control signals are recorded on each track a multiple number of times.

* * * * *